United States Patent
Alger, II

(10) Patent No.: US 8,583,346 B2
(45) Date of Patent: Nov. 12, 2013

(54) CLOSED LOOP CONTROL OF FUEL VISCOSITY IN MULTI-FUEL ENGINE

(75) Inventor: Terrence F. Alger, II, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 751 days.

(21) Appl. No.: 12/861,737

(22) Filed: Aug. 23, 2010

(65) Prior Publication Data

US 2012/0046852 A1   Feb. 23, 2012

(51) Int. Cl.
*F02M 37/00* (2006.01)
*F02M 31/20* (2006.01)
*G01M 15/08* (2006.01)
*F02D 41/00* (2006.01)

(52) U.S. Cl.
USPC .......................................... 701/103; 123/381

(58) Field of Classification Search
USPC .......... 701/103, 102, 115; 123/381, 557, 543, 123/1 A, 575, 578; 73/114.16
See application file for complete search history.

(56) References Cited

U.S. PATENT DOCUMENTS 4,955,345 A * 9/1990 Brown et al. ................. 123/381
7,954,477 B2 * 6/2011 Gruber et al. ................. 123/381

FOREIGN PATENT DOCUMENTS

DE    10322489 A1 * 12/2004
JP    11324831 A * 11/1999

* cited by examiner

Primary Examiner — Hieu T Vo
(74) Attorney, Agent, or Firm — Chowdhury & Georgakis PC; Ann C. Livingston

(57) ABSTRACT

A system and method for controlling the viscosity of liquid fuel delivered from a fuel tank to the fuel injectors of an internal combustion engine. A viscosity sensor is placed in the fuel line, or in a bypass fuel line, in close proximity downstream the fuel injectors. A heat exchanger is placed on the fuel line downstream the sensor. The sensor is a rotating cylinder having a nominal rotation velocity, and is configured to rotate such that the nominal rotation velocity increases or decreases in response to fuel viscosity. The sensor delivers a measurement signal to a control unit, which performs a closed loop algorithm to adjust the heat provided by the heat exchanger until the measured rotation matches a target rotation.

16 Claims, 3 Drawing Sheets

CLOSED LOOP CONTROL OF FUEL VISCOSITY IN MULTI-FUEL ENGINE

TECHNICAL FIELD OF THE INVENTION

This invention relates to internal combustion engines, and more particularly to control of fuel viscosity for such engines.

BACKGROUND OF THE INVENTION

The internal combustion engines of some vehicles are designed to operate with a variety of fuels. In the past, more common applications of multi-fueled vehicle technology were in military settings, where normally-used diesel or gas fuel might not be available during combat operations. However, the growing movement to establish alternatives to automobiles running solely on gasoline has increased the availability of automobiles that use multi-fuel engines, such as bi-fuel or flexible-fuel vehicles.

As a particular example, compression ignition engines are often designed for use with different types of fuels. However, this fuel versatility can be problematic because optimum engine operation tends to call for specificity with regard to fuel viscosity. For example, an engine whose fuel pumps and injectors are designed to use a certain level of viscosity will encounter difficulty operating with fuels having different viscosities.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following invention is directed to sensing and adjusting fuel viscosity delivered to an internal combustion engine. In the simplest embodiments, a simple mechanical device, placed upstream the fuel injection pump, detects changes in fuel viscosity. A fuel having a non optimal viscosity is heated to achieve a lesser viscosity when input to the fuel injection pump.

Figure 1:
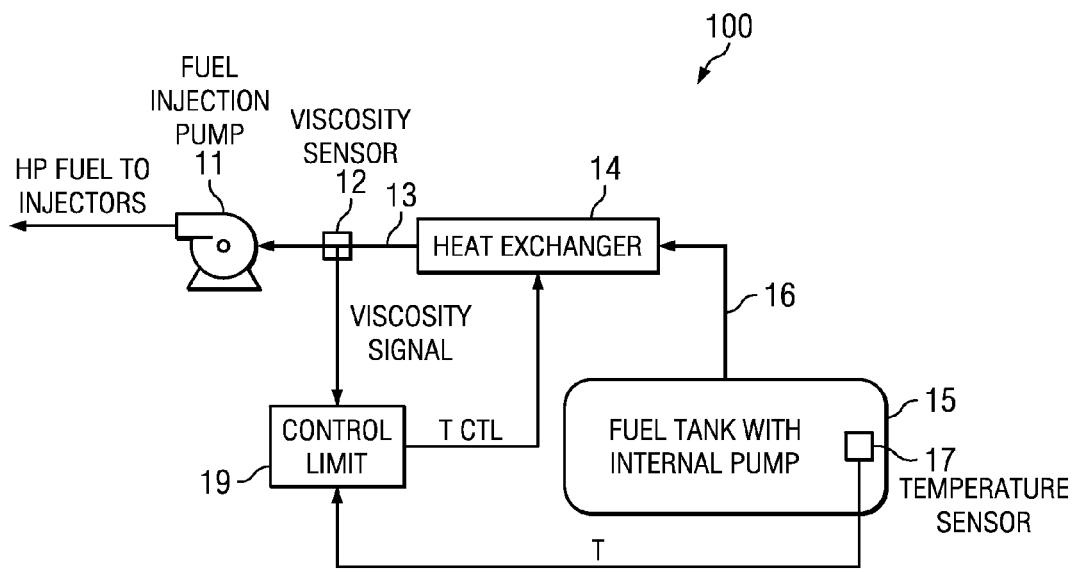
FIG. 1 illustrates an internal combustion engine having closed loop viscosity control.

FIG. 1 illustrates a fuel viscosity control system 100 in use with an internal combustion engine. The engine may be an automotive (or other vehicle engine), but could also be an internal combustion engine used for other applications.

For purposes of simplicity, the engine is not shown other than the fuel injection pump 11. It is assumed that the engine, including pump 11 and fuel injectors (not shown), has a fuel viscosity value that is optimum or otherwise desired for engine operation.

For purposes of example, the engine is a compression ignition engine having a high pressure fuel injection pump 11. As in other internal combustion engines, liquid fuel is stored in a fuel tank 15 having an associated fuel tank pump. The fuel is delivered from the tank 15 to the fuel injection system via a fuel line 16 during engine operation.

As indicated in the Background, a fuel having a viscosity above an optimum value can lead to an increase in the amount of work required to pump a given volume of fuel and/or a decrease in the amount of fuel that is delivered. In addition to affecting pump 11, high viscosity levels can reduce the mass of fuel that a fuel injector can deliver in a given period of time. This can lead to lower torque levels in the engine.

A viscosity sensor 12 detects fuel viscosity prior to delivery to fuel injection pump 11. More specifically, sensor 12 detects fuel viscosity after it passes through a heat exchanger 14 and prior to delivery to pump 11. Depending on the configuration of the fuel injection system (pump, injectors, etc.), it is also possible that the sensor 12 could be placed immediately upstream the fuel injectors. In general, it can be said that sensor 12 is placed upstream the fuel injectors, and may also be placed upstream the fuel injection pump 12.

As explained below, sensor 12 is placed in a fuel delivery line 13 between the heat exchanger 14 and pump 11, or in a bypass from line 13, as appropriate to the type of sensor 12. This location of sensor 12 permits a measurement signal from sensor 12 to be delivered to control unit 19 for closed loop control of viscosity.

Various types of viscosity sensors may be used for sensor 12. Many commercially available viscosity sensors are based on the phenomenon that viscosity may be measured as the resistance a fluid presents to flow. Viscosity measurements utilizing piezoelectric sensors are generally based on the idea that a dissipative or damping force that resists the motion of an energized piezoelectric element lowers its resonant frequency. Vibratory viscometers generally employ a transducer with an immersible portion that is vibrated with a small amplitude. Viscosity can be determined from the frequency or amplitude changes in the vibration or the power required to sustain the vibration when the immersible portion of the transducer is immersed in a fluid of interest.

Although any type of viscosity sensor may be used, a feature of the invention is that no absolute viscosity measurement value is required. It is sufficient to detect a change in viscosity. Two examples of a viscosity sensor that detects viscosity changes using a simple mechanical device are described below in connection with FIGS. 2-4.

Liquid fuel is stored in fuel tank 15, from which it is delivered via a fuel line 16 to heat exchanger 14. As explained below, heat exchanger 14 heats the fuel in response to a control signal from control unit 19. As a result of the heating, the fuel obtains a lower viscosity.

Heat exchanger 14 may be any means of raising the temperature of the fuel, and for example, could be an air-to-liquid heat exchanger using hot air from the exhaust system. Heat exchanger 14 could use exhaust heat, electrical power, a combination of the two, or other methods to increase the temperature of the fuel as it passes through heat exchanger 14.

A temperature sensor 17 is placed in the fuel tank 15 (or elsewhere downstream the heat exchanger), and delivers a temperature measurement signal to control unit 19. Temperature measurement data is used by control unit 19 to discriminate between ambient temperature changes that may affect fuel viscosity and changes in fuel type.

Figure 2:
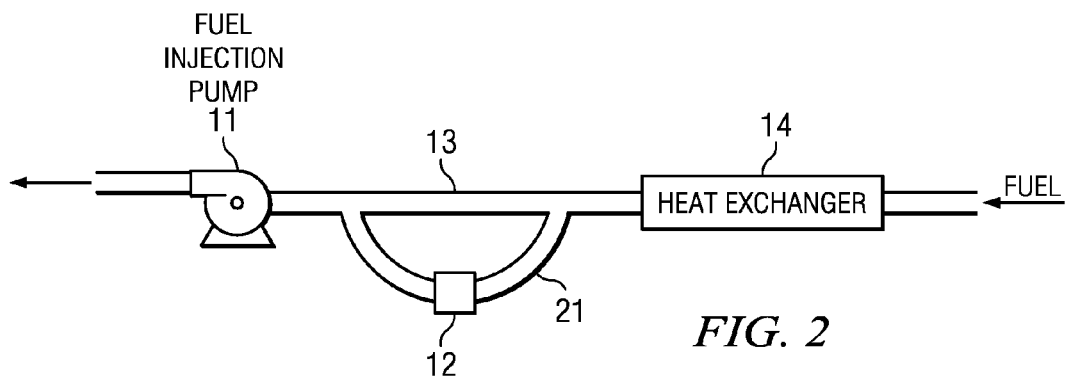
FIG. 2 illustrates a fuel delivery line between the heat exchanger and fuel injection pump and a bypass line for delivering fuel to a sensor.

FIG. 2 illustrates a bypass line 21, through which a small portion of fuel from line 13 is diverted. The sensors described below in connection with FIGS. 3 and 4, which are especially designed to measure viscosity changes using simple mechanisms, are placed on this bypass line 21. The fluid flows past the sensors, and then rejoins the primary fuel flow in line 13.

Figure 3:
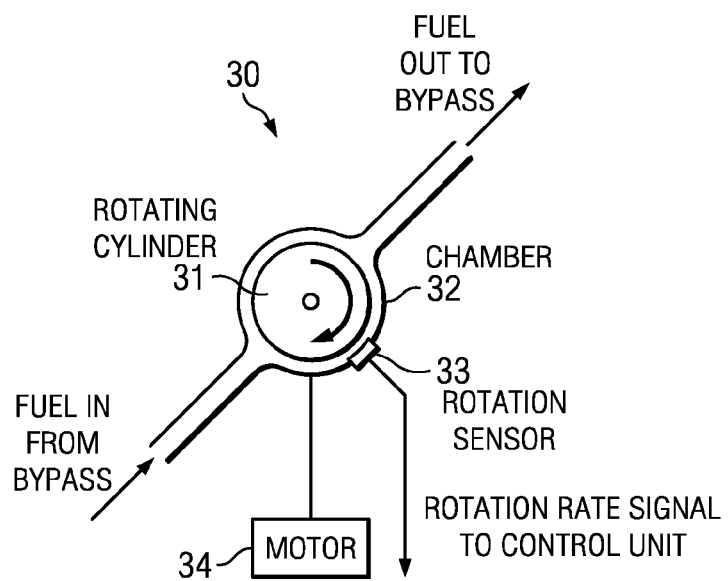
FIG. 3 illustrates one embodiment of a viscosity sensor.

FIG. 3 illustrates an "active" embodiment of viscosity sensor 12, identified as sensor 30. A rotating cylinder 31 is enclosed in a chamber 32, with only a small clearance between the cylinder 31 and the chamber wall. Cylinder 31 is powered by a simple motor 34 or other means to rotate cylinder 31 within chamber 32 at a constant input power. Cylinder 31 may be powered electrically or by other appropriate means.

When a fuel having a target viscosity fills the space between the cylinder 31 and the wall 32, the rotation velocity of the cylinder is determined. Once the rotation velocity at the target viscosity (the target velocity) has been determined, any fuel whose viscosity deviates from the target viscosity will cause the rotation velocity to change. A more viscous fuel will cause the velocity to decrease, whereas a less viscous fuel will cause the velocity to increase.

Thus, in operation, sensor 30 rotates in response to a constant torque. A sensor 33, such as a magnetic pickup or a variable reluctance sensor, is used to detect rotation, and to deliver a signal representing the rotation rate to control unit 19.

Figure 4:
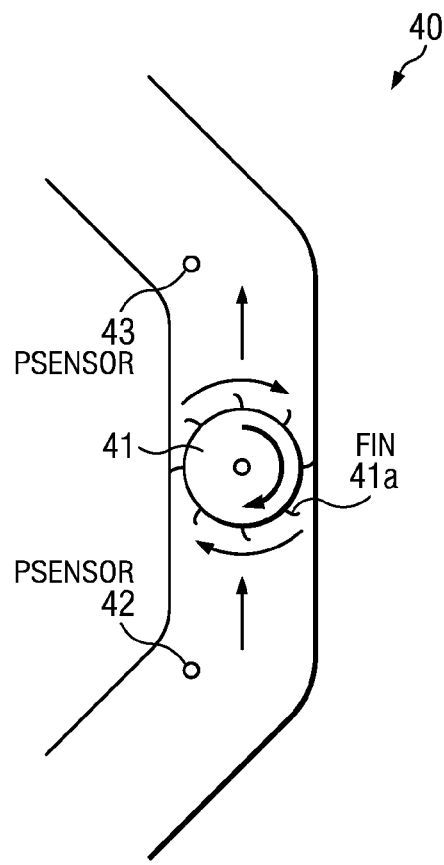
FIG. 4 illustrates a second embodiment of a viscosity sensor.

FIG. 4 illustrates a "passive" embodiment of sensor 12, identified as sensor 40. In this embodiment, the fuel flow pressure is used to rotate a cylinder 41. Like cylinder 31, cylinder 41 is placed within the bypass line 21 such that its outer diameter is slightly smaller than the inner diameter of the bypass line. Small "fins" 41a on the outside of the cylinder 41 encourage the cylinder 41 to rotate as the fuel flows past it. Two pressure sensors 42 and 43, one on each side of sensor 40, measure the fuel flow pressure and deliver pressure measurement signals to control unit 19. Control unit 19 calculates a pressure difference, which is used to calibrate the rotation velocity. Once calibration adjustments are made, changes in rotation velocity can be attributed to changes in viscosity of the fuel.

Referring to both FIGS. 3 and 4, in both embodiments of the viscosity sensor, the rotating cylinder rotates at a "nominal" rate determined by either the speed of a motor or the fuel flow pressure in the fuel line. This nominal rotation rate is decreased or increased by variations in fuel viscosity. In other embodiments, sensor 30 or 40 might be placed directly in the fuel line 13 rather than in a bypass line.

As stated above, immediately upstream from sensor 12, heat exchanger 14 is used to adjust the temperature of the fuel. Control unit 19 is programmed with a closed loop control algorithm to adjust the heat provided by heat exchanger 14 until a target rotation rate of the sensor 30 or 40 is reached. Using the sensors 30 or 40, at no time is an absolute measurement of fluid viscosity required. A target viscosity is established by calibrating a nominal fuel to a given reading from sensor 12, such that an absolute viscosity measurement is not required.

Figure 5:
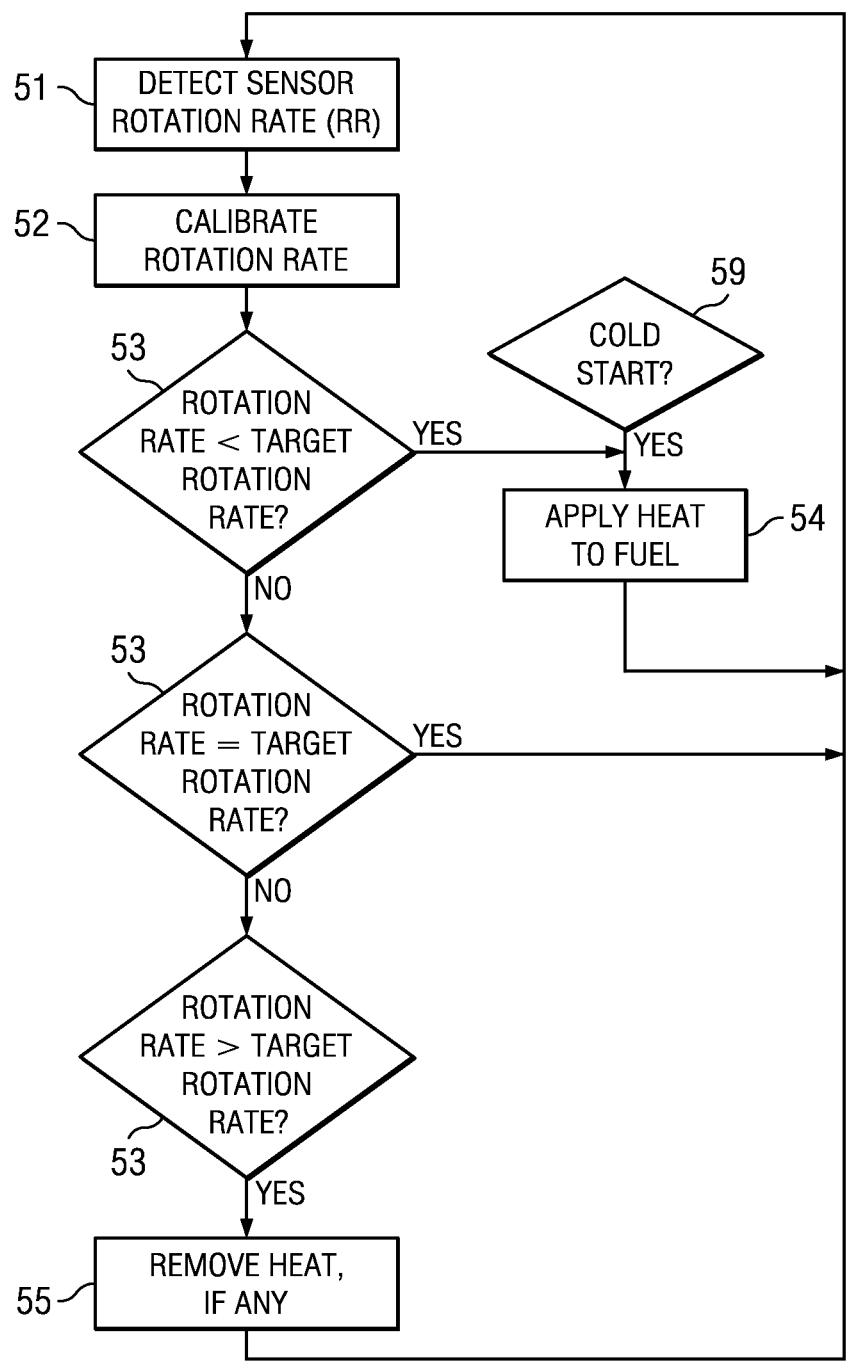
FIG. 5 illustrates a method of controlling fuel viscosity using the sensor of FIG. 3 or FIG. 4.

FIG. 5 illustrates a method of controlling fuel viscosity, using one of the sensors illustrated in FIG. 3 or 4 (sensor 30 or 40). This method outlines this basic programming algorithm for control unit 19, which has appropriate software and hardware for converting sensor signals to data, for performing the algorithm, for storing calibration data and target values, and for delivering control signals, all as described herein.

Step 51 is detecting the rotation rate (RR) of the sensor 30 or 40. The control unit receives a measurement signal from the sensor, and converts the signal to data.

Step 52 is calibrating the rotation rate measurement. As explained above, this may involve receiving fuel temperature data to ensure that rotation rate changes are not the result of ambient temperature changes. Also, if the sensor in use is of the type described in FIG. 4 (the passive sensor), pressure difference measurements are received and a pressure difference value is obtained. This is used to calibrate the rotation rate to compensate for any fluctuations in fuel flow pressure.

Step 53 is comparing the measured and calibrated rotation rate to a stored target rotation rate. If the measured rate matches the stored rate, no adjustments are made to the heat, if any, being provided by heat exchanger 14.

If the rotation rate is less than the target rotation rate, the fuel viscosity is deemed to be too high. A control signal is delivered to heat exchanger 14 to adjust the heating provided to the fuel. The heat may be incrementally increased until the measured rotation rate matches the target rotation rate. The control unit 19 may be programmed to calculate a specific increment or the increments may be preset.

If the rotation rate is greater than the target rate, the fuel viscosity is deemed to be less than optimal. In Step 55, the heat, if any, being provided by the heat exchanger is reduced. In the case of a diesel engine, alternative fuels tend to have higher viscosities than diesel fuel, so a lower than optimal viscosity is not the usual case.

In other embodiments, and in particular embodiments that use a viscosity sensor that measures viscosity rather than rotation of a cylinder, the stored target value would be a viscosity value. The comparison of Step 53 would then determine if the measured viscosity value were greater than the stored value. If so, the heating signal would then be generated.

As indicated by Step 59, the control unit may be programmed to determine if a cold start engine condition exists, and if so, to automatically generate a heating control signal to warm the fuel.

Thus, one advantage of the invention is that cold starting a diesel engine is greatly facilitated. Even with "normal" diesel fuel, cold start of a diesel engine conventionally requires special cold start modes and calibrations. These special cold start methods are unnecessary if the viscosity control method of the present invention is used.

An overall advantage of the invention is that an engine can operate on a multiplicity of fuels, which run through the fuel system at a constant viscosity. This reduces the amount of calibration effort, adaptive learning by the engine control unit, and the requirement to measure or quantify fuel properties.

What is claimed is:

1. A system for controlling the viscosity of liquid fuel delivered from a fuel tank to the fuel injectors of an internal combustion engine, comprising:
   a fuel line for delivering fuel from the fuel tank;
   a heat exchanger for receiving fuel from the fuel tank and for heating the fuel in response to a heating control signal;
   a viscosity sensor placed in the fuel line, or in a bypass fuel line, between the heat exchanger and the fuel injectors;
   wherein the viscosity sensor is a rotating cylinder having a nominal rotation velocity, configured to rotate such that the nominal rotation velocity increases or decreases in response to fuel viscosity, and configured to generate a rotation measurement signal; and
   a control unit programmed to store a target value, to receive the rotation measurement signal from the viscosity sensor, to obtain a rotation measurement value from the rotation measurement signal, to compare the rotation measurement value to the target value, to generate a heating control signal when the rotation measurement value is less than the target value, and to deliver the heating control signal to the heat exchanger.

2. The system of claim 1, wherein the cylinder has an associated motor, and the nominal rotation velocity is provided by the motor.

3. The system of claim 1, wherein the cylinder has at least one fin on its external surface, and the nominal rotation velocity is provided by fuel flow pressure against the fin.

4. The system of claim 3, further comprising a pair of flow pressure sensors, one upstream and one downstream the sensor, each configured to deliver a pressure measurement signal to the control unit, and wherein the control unit is further programmed to use the pressure measurement signals to calibrate the rotation measurement value.

5. The system of claim 1, further comprising a temperature sensor for determining the temperature of the fuel downstream the heat exchanger, and wherein the control unit is further programmed to receive a temperature signal from the temperature sensor, and to calibrate the viscosity measurement signal based on the temperature signal.

6. The system of claim 1, wherein the control unit is further programmed with a closed loop algorithm such that the heating control signal increases the heat provided by the heat exchanger until the rotation measurement value matches the target value.

7. The system of claim 1, wherein the heat exchanger uses thermal energy from the engine's exhaust system.

8. A method for controlling the viscosity of liquid fuel delivered from a fuel tank to the fuel injectors of an internal combustion engine, comprising:
   delivering fuel from the fuel tank to a heat exchanger;
   using the heat exchanger to heat the fuel in response to a heating control signal;
   using a viscosity sensor placed in the fuel line, or in a bypass fuel line, between the heat exchanger and the fuel injectors, and having a cylinder that rotates at a nominal rotation rate, to generate a rotation measurement signal; and
   using a control unit programmed to store a target value, to receive the rotation measurement signal from the viscosity sensor, to obtain a rotation measurement value from the rotation measurement signal, to compare the rotation measurement value to the target value, to generate a heating control signal when the rotation measurement value is less than the target value, and to deliver the heating control signal to the heat exchanger.

9. The method of claim 8, wherein the cylinder has an associated motor, and the nominal rotation velocity is provided by the motor.

10. The method of claim 8, wherein the cylinder has at least one fin on its external surface, and the nominal rotation velocity is provided by fuel flow pressure against the fin.

11. The method of claim 10, further comprising a pair of flow pressure sensors, one upstream and one downstream the sensor, each configured to deliver a pressure measurement signal to the control unit, and wherein the control unit is further programmed to use the pressure measurement signals to calibrate the rotation measurement value.

12. The method of claim 8, further comprising a temperature sensor for determining the temperature of the fuel downstream the heat exchanger, and wherein the control unit is further programmed to receive a temperature signal from the temperature sensor, and to calibrate the viscosity measurement signal based on the temperature signal.

13. The method of claim 8, wherein the control unit is further programmed with a closed loop algorithm such that the heating control signal increases the heat provided by the heat exchanger until the rotation measurement value matches the target value.

14. The method of claim 8, wherein the heat exchanger uses thermal energy from the engine's exhaust system.

15. A method for controlling the viscosity of liquid fuel delivered from a fuel tank to the fuel injectors of a diesel-fueled internal combustion engine, comprising:
   delivering fuel from the fuel tank to a heat exchanger;
   using the heat exchanger to heat the fuel in response to a heating control signal;
   using a viscosity sensor placed in the fuel line, or in a bypass fuel line, between the heat exchanger and the fuel injectors, and having a cylinder that rotates at a nominal rotation rate, to generate a rotation measurement signal; and
   using a control unit programmed to store a target value, to receive the rotation measurement signal from the viscosity sensor, to obtain a rotation measurement value from the rotation measurement signal, to compare the rotation measurement value to the target value, to generate a heating control signal when the rotation measurement value is less than the target value, and to deliver the heating control signal to the heat exchanger.

16. The method of claim 15, wherein the control unit is further programmed to determine a cold start condition of the engine, and to deliver the heating control signal during the cold start condition.

* * * * *